United States Patent [19]

Brierley

[11] Patent Number: 5,084,890
[45] Date of Patent: Jan. 28, 1992

[54] PUMPED CW LASER WITH LOW DOPANT LEVEL LASER MEDIUM

[75] Inventor: Michael C. Brierley, Ipswich, England

[73] Assignee: British Telecommunications public limited company, Great Britain

[21] Appl. No.: 602,277

[22] PCT Filed: May 18, 1989

[86] PCT No.: PCT/GB89/00538
§ 371 Date: Nov. 14, 1990
§ 102(e) Date: Nov. 14, 1990

[87] PCT Pub. No.: WO89/11744
PCT Pub. Date: Nov. 30, 1989

[30] Foreign Application Priority Data

May 19, 1988 [GB] United Kingdom ............ 8811820

[51] Int. Cl.$^5$ .................................. H01S 3/17
[52] U.S. Cl. .......................... 372/40; 372/6; 372/33; 372/70
[58] Field of Search .............. 372/6, 40, 41; 350/96.34; 501/11, 35, 37, 40

[56] References Cited

U.S. PATENT DOCUMENTS 4,788,687 11/1988 Miniscalco et al. ............ 372/40

OTHER PUBLICATIONS

Soviet Journal of Quantum Electronics, vol. 13, No. 2, Feb. 1983, Bagdasarov et al: "Steady state emission, etc.", pp. 262-263.
Soviet Journal of Quantum Electronics, vol. 13, No. 9, Sep. 1983, Zhekov et al: "Efficient cross-relaxation, etc.", pp. 1235-1237.
Electronics Letters, vol. 24, No. 6, Mar. 17, 1988, Pollack et al: "Laser emission . . . fluoride glass", pp. 320-322.
Applied Physics Letters, vol. 50, No. 22, Jun. 1, 1987, Kintz et al: "CW and pulsed 2.8 µm laser, etc." pp. 1553-1555.
Kaminskii: "Laser Crystals", 1981, pp. 52-55, Self-saturating laser transitions.
Physical Review B, Condensed Matter, vol. 27, No. 11, Jun. 1, 1983, Shinn et al: "Optical transitions, etc.", pp. 6635-6648.
Electronics Letters, vol. 24, No. 15, Jul. 21, 1988, Brierley et al: "Continuous wave lasing, etc.", pp. 935-937.
Optics Communications, vol. 59, No. 1, Aug. 1, 1986, Demirkhanyan et al: "Investigation . . . Lutetium Garnet", pp. 49-51.
Soviet Journal of Quantum Electronics, vol. 12, No. 3, Mar. 1982, Andriasyan: Millisecond . . . : Er laser, p. 366.
Soviet Journal of Quantum Electronics, vol. 13, No. 9, Sep. 1983, Antipenko: "Quasi-continuous lasing, etc.", pp. 1237-1239.
Electronics Letters, vol. 25, No. 1, Jan. 5, 1989, Allain et al: "Erbium-Doped Fluorozirconate Single-Mode, etc.", p. 28.

*Primary Examiner*—William L. Sikes
*Assistant Examiner*—Galen J. Hansen
*Attorney, Agent, or Firm*—Nixon & Vanderhye

[57] ABSTRACT

A 2.7Sg(m)m laser comprises a single mode fluoro-zirconate optical fibre doped with 0.086 mole % $Er^{3+}$. C-W operation of the usually self-terminating lasing transition $^4I_{11/2}$ to $^4I_{13/2}$ is achieved by applying excitation energy to a suitable wavelength and intensity to elevate ions from the lower lasing level to maintain a population inversion between the upper and lower lasing levels during lasing. The laser may be pumped at a single wavelength of about 785 nm by a semiconductor laser.

9 Claims, 5 Drawing Sheets

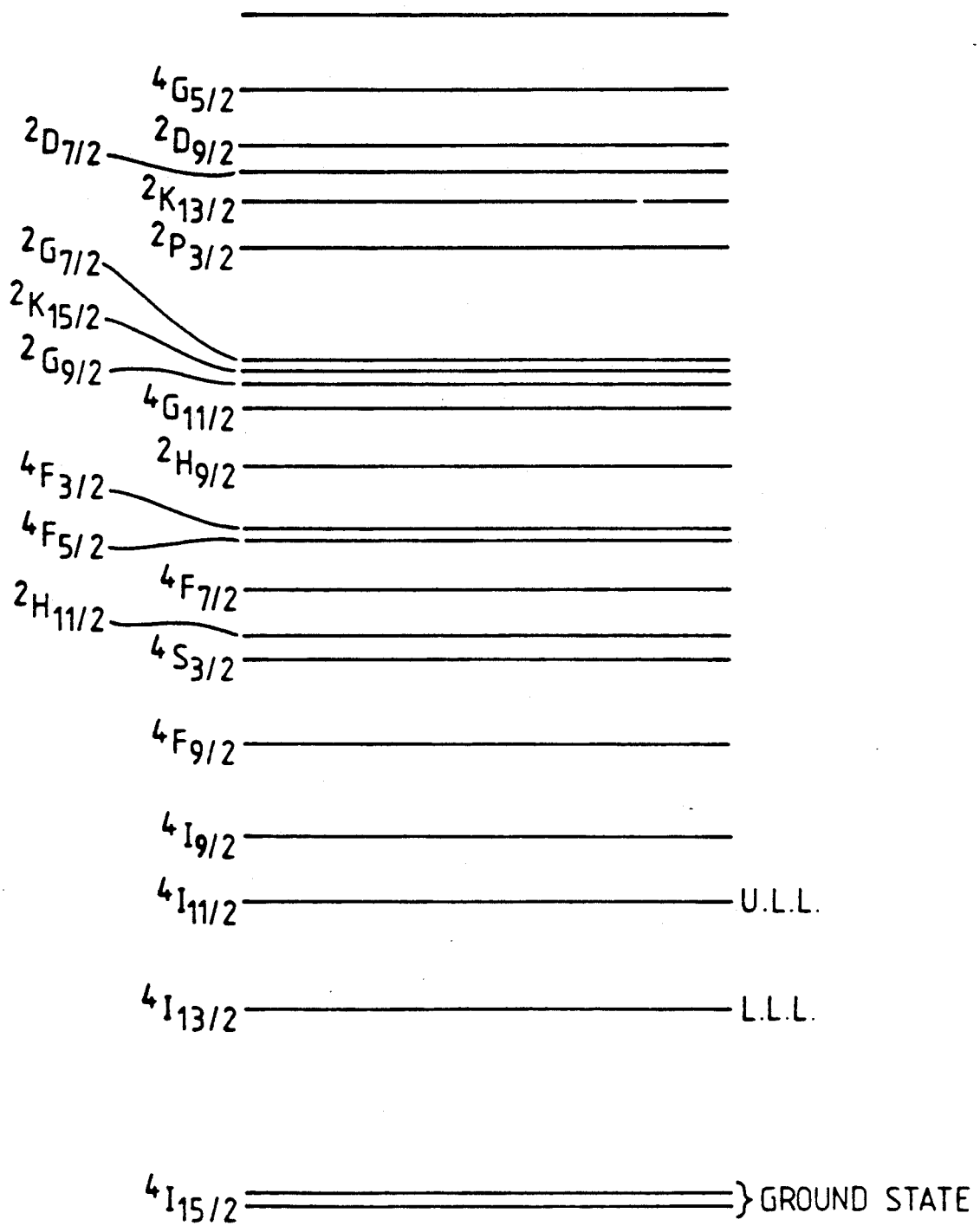

PUMPED CW LASER WITH LOW DOPANT LEVEL LASER MEDIUM

FIELD OF THE INVENTION

This invention relates to lasers.

BACKGROUND OF THE INVENTION

Lasers are known which depend for their operation on lasing transitions between upper and lower lasing levels of ions in a lasing medium each of which levels lies above the ions' ground state. If the average lifetime of ions in the upper lasing level (ULL) is longer than the lifetime of ions in the lower lasing level (LLL) then pumping of the laser medium to populate the ULL by excitation of ions from the ground state, perhaps via a level above the ULL, can be employed to maintain the population inversion between the ULL and LLL to allow lasing action to proceed. If, however, the lifetime of the ULL is shorter than the LLL, the lasing transition is known as self-terminating because the build up of ions in the LLL destroys the population inversion required for lasing. Consequently such self-terminating lasers normally only operate in pulsed form the LLL being given time to empty between pumping pulses.

One example of such a transition is the $^4I_{11/2}$ to $^4I_{13/2}$ transition of the erbium ion which is self-terminating in the majority of investigated host media. This self-limiting transition of the erbium ion produces 2.7 to 3 $\mu m$ laser output which, if obtainable in extended continuous wave operation, would have considerable applications to future long-haul optical communications, medical and sensing systems.

International patent applications having International publication numbers W087/07447 and W087/07448 teach one method of providing at least quasi-continuous lasing operation using of this normally self-limiting transition. The erbium ions are of sufficient density that their close proximity permits energy transfer between ions in the LLL. Ions are excited to the LLL from the ground state where they interact, some ions being elevated to a higher energy level, one or more other ions dropping through a non-radiative process to the ground state for each one so elevated. This produces a population inversion between the levels to produce lasing. A pulse of 1.5 $\mu m$ light provides the initial populating of the LLL which is then followed by the ion interaction to produce a self-terminating lasing operation between the ULL and LLL. Quasi-continuous lasing is obtainable by sequentially flashing flash lamps having a flash duration of 15 to 20 ms to maintain the co-operative ion interaction.

In an article by B. M. Antipenko, U. B. Raba, K. B. Seiranyan and L. K. Sukhareva entitled "Quasi-continuous lasing of an LiYF$_4$:Er:Pr crystal at 0.85 $\mu$" Sov. J. Quantum Electron. 13(9) Sep 1983 pp 1237–1239 it was opined that the relaxation of the $^4I_{13/2}$ level of Erbium in LiYFu:Er:Pr crystal (by selective quenching of the level by the Pr ions) is accelerated by the flash lamp radiation itself. However, to achieve true continuous wave operation it is necessary to provide continuous high pump intensity which is impracticable. The short lifetime of the pump lamps would prevent extended operations and there would be a requirement to cool the laser medium.

SUMMARY OF THE INVENTION

It is an object of the present invention to provide a laser which does not require such high power pumping to maintain continuous wave lasing in an otherwise self-terminating lasing transition. Accordingly, the present invention provides a laser comprising a laser cavity; a laser medium disposed within the cavity which incorporates lasing ions having an upper and a lower lasing level each above the ions' ground state the doping level being insufficient to support ion-ion interaction up-conversion; and a pumping means for applying excitation energy of a suitable wavelength and intensity to elevate ions from the lower lasing level to maintain a population inversion between the upper and lower lasing levels during lasing.

This arrangement may require the pump means to also provide pumping at a second wavelength with an intensity sufficient to excite ions from the ground state to the ULL in the manner usual with non-self terminating 4-level lasers. The use of excited state absorption to provide the means of maintaining a population inversion to produce cw lasing eliminates the need to use high dopant concentrations, as inter-ion interactions are not required to provide a non-self terminating lasing transition. Instead low dopant concentrations can be employed pumped highly efficiently by a laser for example. This is particularly the case if the laser medium comprises a doped optical fibre as the waveguiding properties of the fibre means high power densities can be maintained over large interaction lengths. This is also thermally efficient as the fibre core has a high surface to volume ratio. In a preferred arrangement the wavelengths and intensity of the pump excitation energy which elevates ions from the LLL is chosen so that it also is suitable for elevating ions from the ground state to at least the upper lasing level. This provides a much simplified arrangement in that a single wavelength source can be used to pump the ions to the ULL and to depopulate the LLL to prevent saturation.

BRIEF DESCRIPTION OF THE DRAWINGS

Embodiments of the invention and their method of operation will now be described by way of example only with reference to the accompanying drawings in which:

FIG. 6 is the diagram as shown in FIG. 3 illustrating pumping at a second single wavelength.

FIG. 1 shows a laser comprising a laser cavity defined by dielectric mirrors 2, 4 highly reflective (95%, >99%) at 2.7 $\mu m$ butted to a single mode optical fibre 0.5 m long having a 40 $\mu m$ core 8 of fluoro-zirconate (ZBLANP) glass doped with 0.086 mole % $Er^{3+}$ ions constituting the lasing medium. An argon ion laser 10 is arranged to pump the fibre laser 8 as will now be explained.

Referring to FIG. 2 there is shown a generalised 4-level laser energy diagram. Ions are excited to a pump level from the ground state by the excitation energy. The ions decay via radiative or non-radiative transitions until they reach a metastable upper lasing level ULL. If a population inversion can be established with a lower lasing level LLL a lasing transition can be established between the ULL and LLL.

$Er^{3+}$ in a glass host, as in the embodiment of FIG. 1, has a lasing transition between ULL $^4I_{11/2}$ and LLL $^4I_{13/2}$ emitting 2.7 μm radiation, both levels being above the ground state $^4I_{15/2}$. The measured lifetimes for the ULL and LLL are 7.8 ms and 10.2 ms, that is, this lasing transition is self-terminating. Referring now to FIG. 4 there is shown superimposed on the energy level diagram of FIG. 3 a pumping scheme in which the argon ion laser 10 is operating in all-lines mode. The principal wavelengths contributing to the lasing operation are 488 nm exciting ions from the ground state to the $^4F_{7/2}$ level and 514 nm exciting to the $^2H_{11/2}$ level forming the first group of wavelengths, and 476.5 nm exciting ions from the $^4I_{13/2}$ LLL to the $^2G_{7/2}$: $^2K_{15/2}$: $^2G_{9/2}$ triplet level the latter maintaining a population inversion between the upper and lower lasing levels during lasing.

FIGS. 5 and 6 illustrate pumping schemes in which only one pump wavelength is required. By selecting an excitation energy which has a suitable wavelength and intensity to both elevate ions from the LLL and to elevate ions from the ground state to above the ULL the 2.7 μm $^4I_{11/2}$ to $^4I_{13/2}$ lasing transition can be maintained continuously by pumping at only one wavelength. Examples for the $Er^{3+}$ laser medium of FIG. 1 are wavelengths which simultaneously cause the transitions $^4I_{15/2}$ to $^4F_{7/2}$ and $^4I_{13/2}$ to $^4G_{7/2}$: $^2K_{15/2}$: $^4G_{9/2}$ or
$^4I_{15/2}$ to $^4I_{9/2}$ and $^4I_{13/2}$ to $^2H_{11/2}$ (476.5 nm and 785 nm, respectively) as shown in FIGS. 5 and 6 respectively. This latter scheme is particularly attractive as it could be implemented using a semiconductor laser pump.

Figure 1:
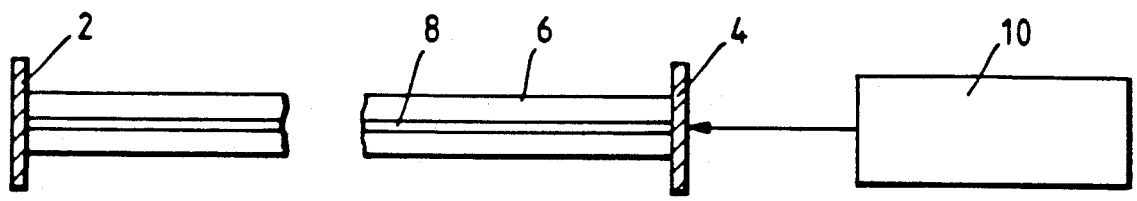
FIG. 1 is a schematic diagram of an embodiment a laser according to the present invention.
Figure 2:
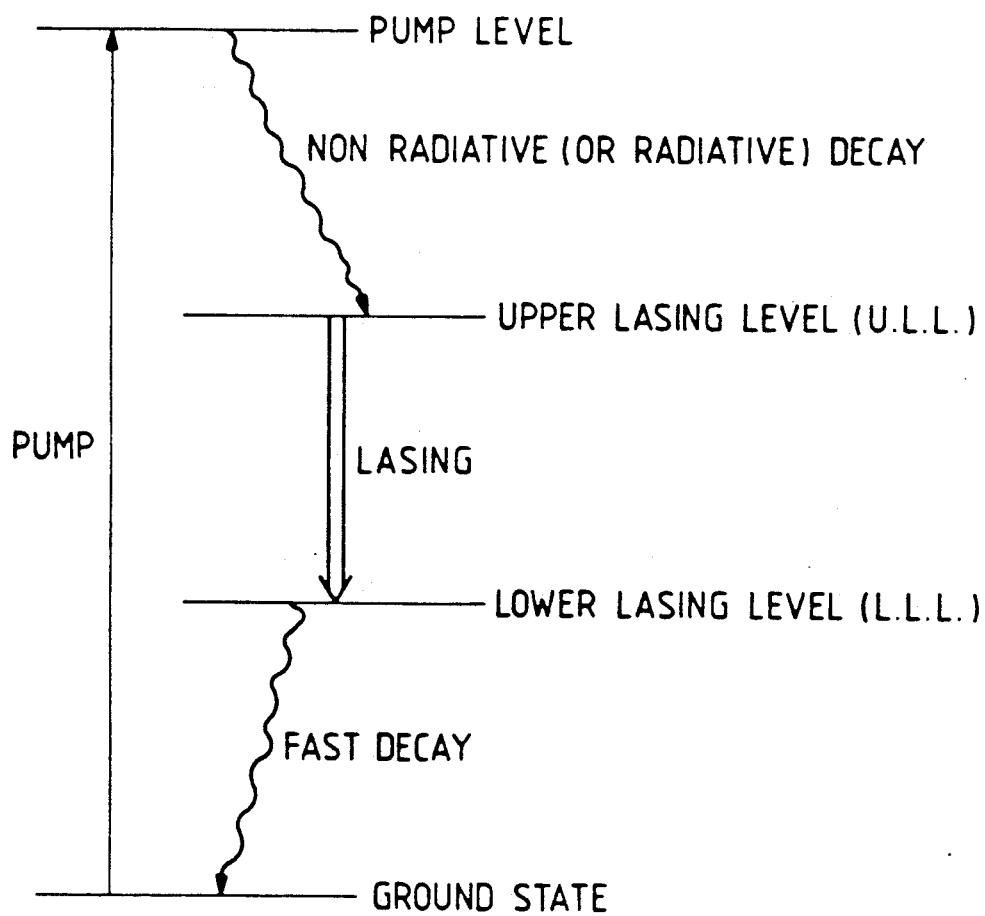
FIG. 2 is a diagram of a generalised 4-level laser energy level diagram.
Figure 3:
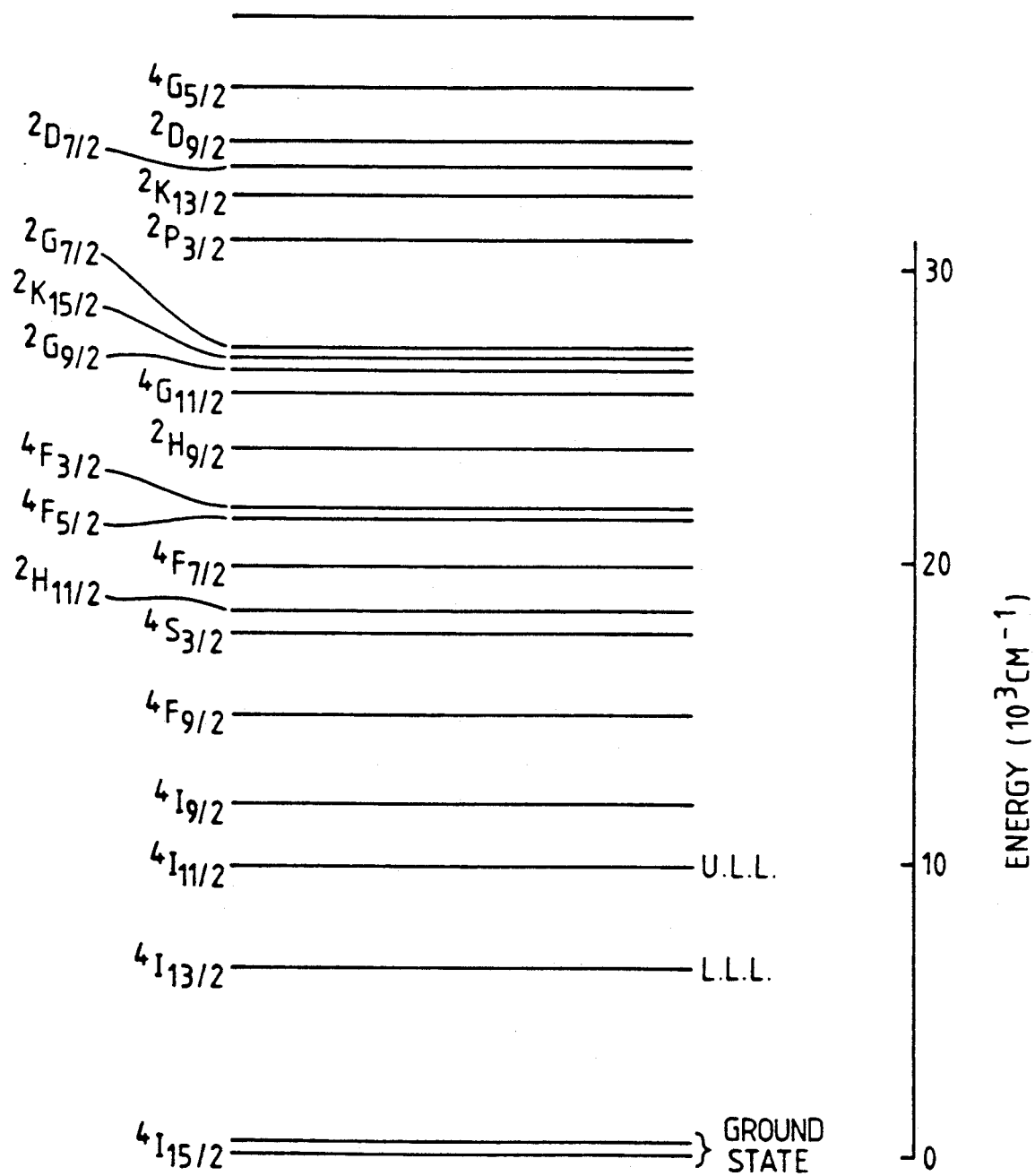
FIG. 3 is a diagram of the energy level diagram of $Er^{3+}$ in glass.
Figure 4:
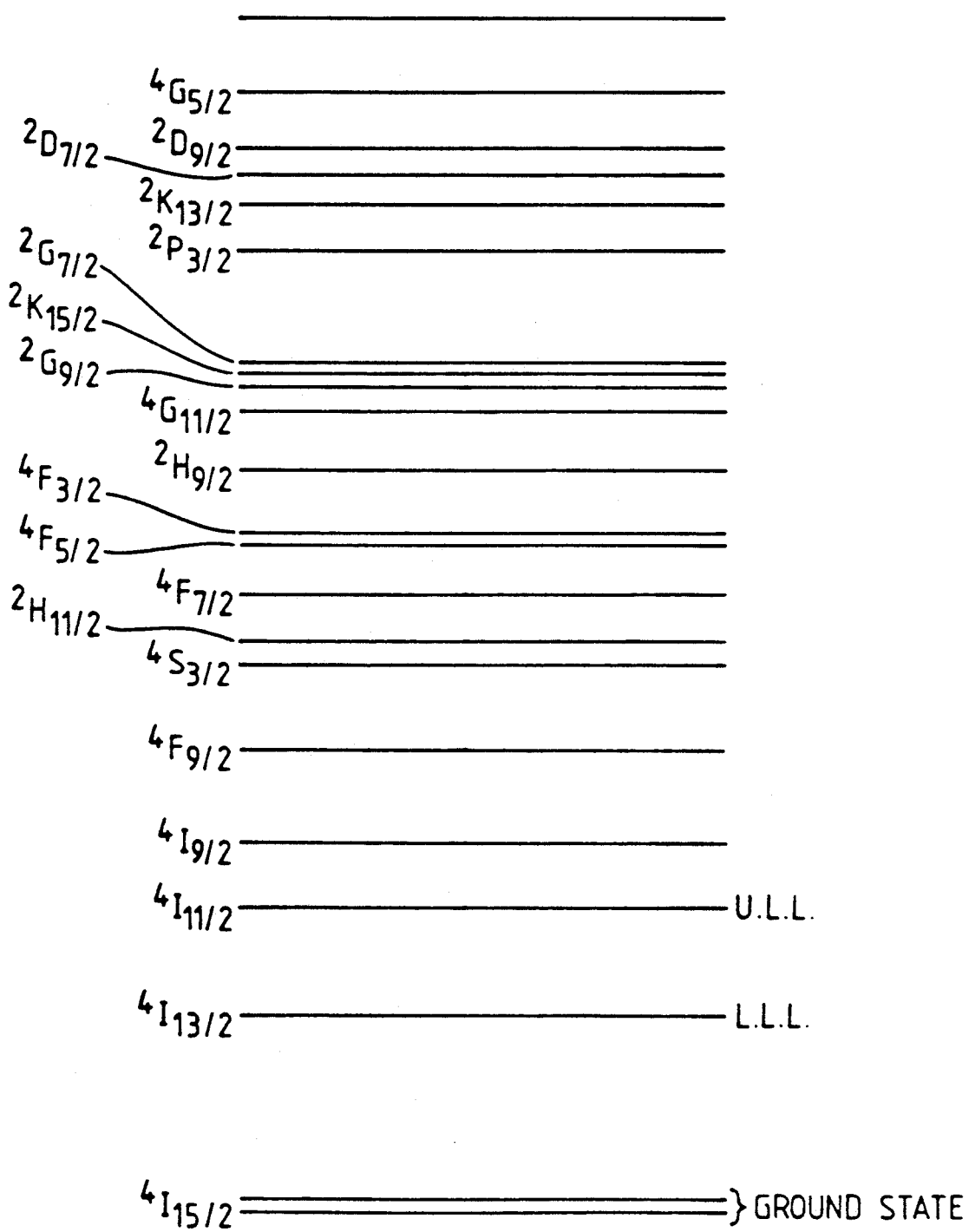
FIG. 4 is the diagram as shown in FIG. 3 illustrating pumping at three wavelengths of excitation energy.
Figure 5:
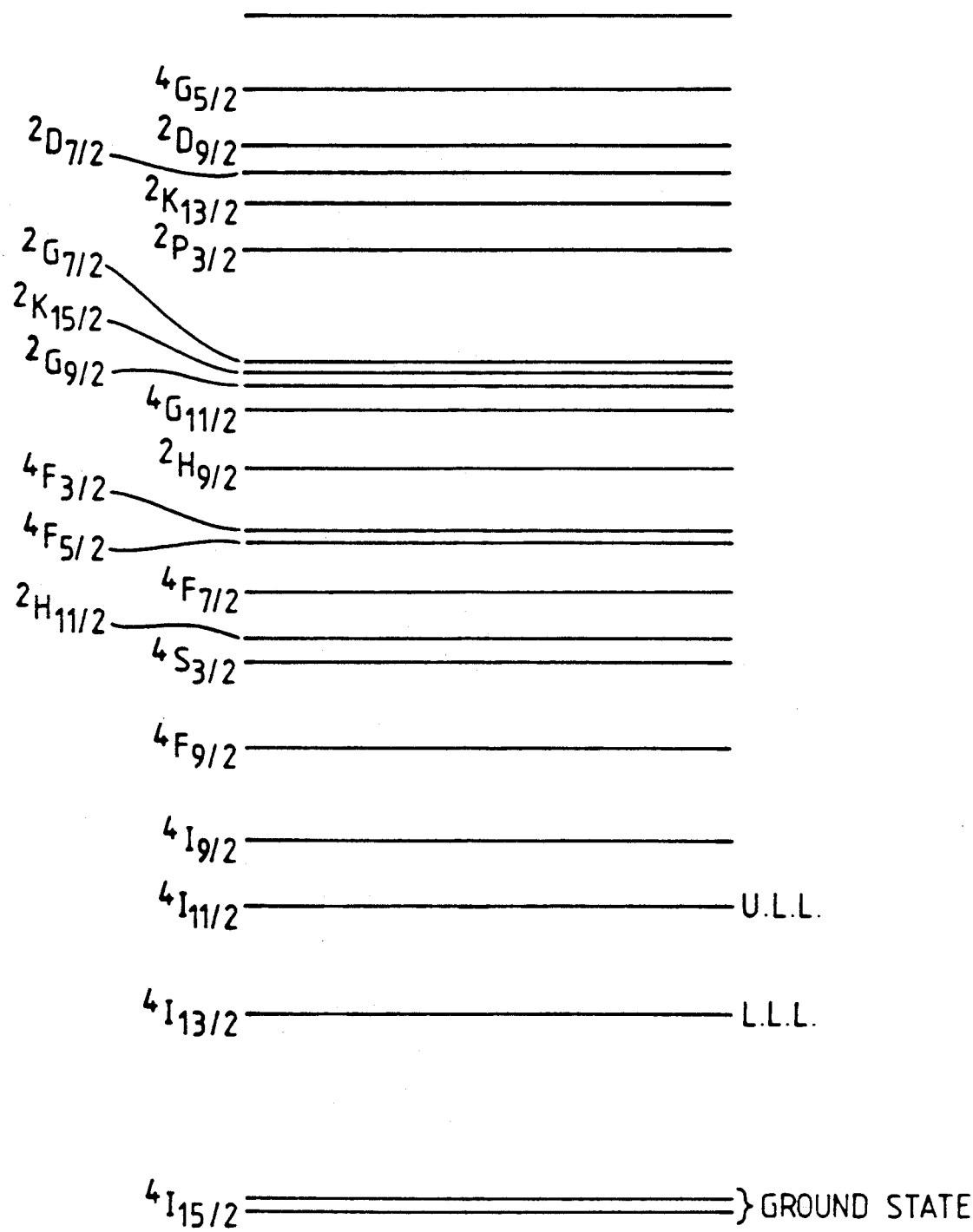
FIG. 5 is the diagram as shown in FIG. 3 illustrating pumping at a single wavelength.

Pumping with over 1W of either 488 nm into the $^4F_{7/2}$ level or 514 nm into the $^2H_{11/2}$ level with absorptions of 10.3 and 11.8 dB/m, respectively, produced no laser action suggesting that any ion-ion interaction is not strong enough to significantly depopulate the lower lasing level. However pumping at 476.5 nm where the absorption is 4.2 dB/m does produce c.w. lasing at 2.702 μm. The threshold launched power was 191 mw corresponding to 73 mw of absorbed power.

It will be appreciated that the present invention will be applicable to self-terminating lasing transitions other than those of $Er^{3+}$ and that forms of laser medium other than optical fibres may be employed where the ESA from the LLL is an available mechanism.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A laser comprising:
   a laser cavity;
   a laser medium disposed within the cavity, said medium including fluoro-zirconate glass hosting erbium ions at doping levels insufficient to support ion-ion interaction up-conversion, which lasing ions have an upper and a lower lasing level each above the ions' ground state which levels form a normally self-terminating laser transition, said lasing ions also having a further excitation level above said upper lasing level; and
   a continuous wave pumping means for applying excitation energy of a wavelength and intensity suitable to elevate ions from the lower lasing level to said further excitation level by excited state absorption to maintain a population inversion between the upper and lower lasing levels whereby cw lasing between said upper and lower lasing levels is obtainable.

2. A laser as in claim 1 in which the excitation energy has a wavelength and intensity suitable to also elevate ions from the ground state to the upper lasing level.

3. A laser as in claim 2 in which the excitation energy corresponds to the $^4I_{15/2}$ to $^4F_{7/2}$ transition.

4. A laser as in claim 2 in which the excitation energy corresponds to the $^4I_{15/2}$ to $^4I_{9/2}$ transition.

5. A laser as in claim 1, 2, 3 or 4 in which the laser medium is a waveguide.

6. A laser as in claim 4 in which the waveguide is an optical fibre.

7. A laser as in claim 1, 2, 3, 4 or 6 in which the pumping means comprises an argon ion laser operating in all-lines mode.

8. A laser as in claim 1, 2, 3, 4 or 6 in which the pumping means is a semiconductor laser.

9. A laser as in claim 1, 2, 3 or 4 in which the erbium ion doping level does not substantially exceed 0.086 mole % $Er^{3+}$ ions.

* * * * *